UNITED STATES PATENT OFFICE.

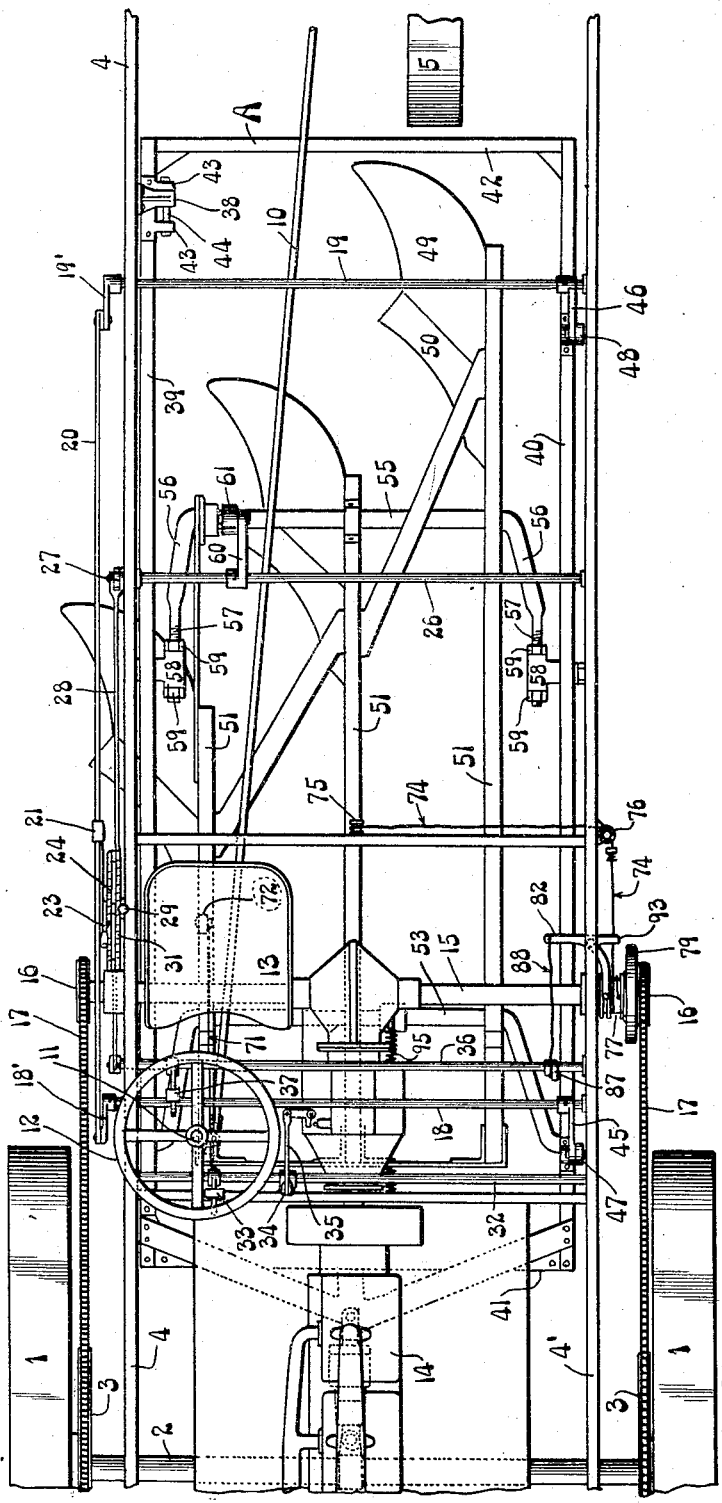

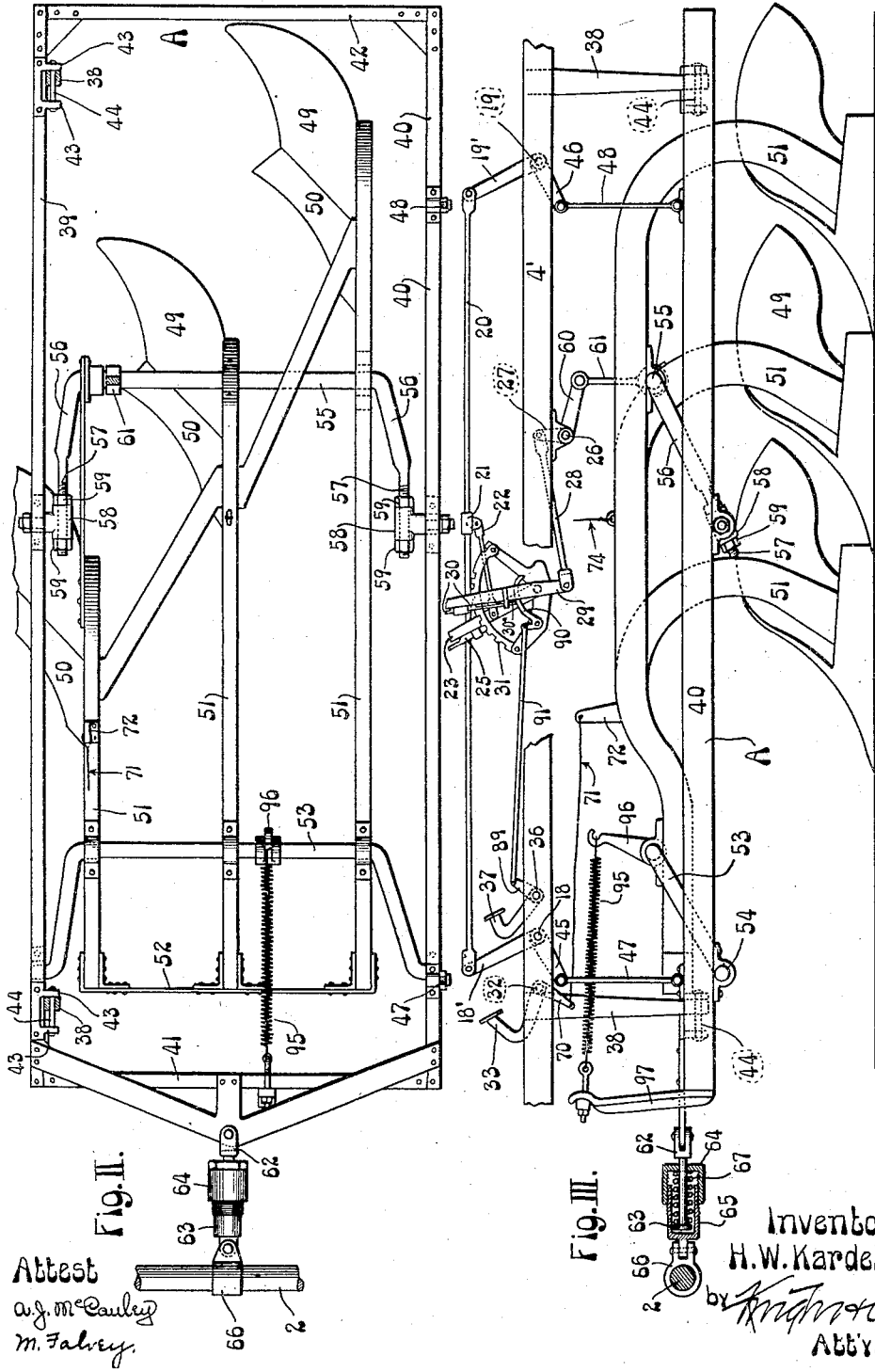

HENRY W. KARDELL, OF ST. LOUIS, MISSOURI.

TRACTOR.

1,199,566.  Specification of Letters Patent.  Patented Sept. 26, 1916.

Application filed May 23, 1913. Serial No. 769,356.

*To all whom it may concern:*

Be it known that I, HENRY W. KARDELL, a citizen of the United States of America, and a resident of the city of St. Louis and State of Missouri, have invented certain new and useful Improvements in Tractors, of which the following is a full, clear, and exact description, reference being had to the accompanying drawings, forming a part of this specification.

My invention relates to a traction plow, the improvements contemplating not only the draft of the plow through the medium of a tractor, but also more particularly, means for the adjustment of the plow into varying positions when placed in and out of service; and means for regulating or equalizing the adjustment of the plow.

In the drawings: Figure I is a top or plan view of my traction plow with the front and rear portions of the tractor omitted. Fig. II is a top or plan view of the plow proper and carrying frame. Fig. III is a side elevation of the plow proper and carrying frame, and also the adjusting and regulating mechanisms.

The tractor of my traction plow includes a pair of front ground wheels 1 secured to an axle 2, the ground wheels being supplied with suitable means such as sprocket wheels 3 to which power is transmitted to impart rotation to the said ground wheels from the engine of the tractor as will hereinafter more fully appear. The tractor frame comprises longitudinal side beams 4 and 4' extending from front to rear of the frame, and also comprises suitable cross members uniting said beams at their front and rear ends and intermediate of their ends. The tractor frame is supported at its rear end, when the tractor is utilized as a draft medium for my plow, by a steering wheel 5.

The steering device includes a connecting rod 10 which may be connected to the wheel 5 by any suitable devices. The connecting rod 10 extends forwardly from the location of the steering wheel 5 to the steering shaft 11 to which it is geared in any suitable manner. The steering shaft 11 is provided with a hand wheel 12, or other suitable member by which said shaft may be rotated to impart longitudinal movement to the connecting rod 10 for the purpose of causing the steering wheel 5 to direct the course of the tractor when it is propelled on the ground.

Adjacent to the steering shaft 11 is a driver's seat 13 that is mounted on the tractor frame in any suitable manner.

14 designates an engine or motor of any suitable description carried by the tractor frame to supply the necessary power for operating the tractor and the plow elements carried by said tractor. Inasmuch as no invention is herein claimed for any particular engine or motor it is deemed unnecessary to give any further description relative thereto.

15 designates a jack shaft operable by the engine 14. This jack shaft extends transversely of the tractor and is journaled to the side beams 4 and 4' of the tractor frame. The jack shaft serves as a medium for driving the ground wheels 1 and, as convenient means of transmitting power from said jack shaft to said ground wheels, I mount upon said jack shaft, adjacent its ends, sprocket wheels 16 that receive endless drive chains 17 operable on the sprocket wheels 3.

Before proceeding to a description of the plow elements carried by the tractor I will enumerate the parts carried by the tractor frame and through the medium of which the plow frame and plow proper, or plows proper when the latter are used in gang, are supported and adjusted according to requirements.

18 and 19 designate, respectively, forward and rear transverse rock shafts journaled to the side beams of the tractor frame. These rock shafts are provided, respectively, with crank arms 18' and 19' united by a connecting rod 20 extending longitudinally of the tractor (see Figs. I and III). The connecting rod 20 is attached by means of a clip 21 and a link 22 to a manually operable lever 23 that has pivotal connection with the tractor frame adjacent to the driver's seat 13. The lever 23 is positioned alongside of a toothed quadrant 24, which is adapted to be engaged by a latch bolt 25 carried by the lever and serving as a means for holding the lever in a set position after it has been adjusted to impart longitudinal movement to the connecting rod 20 and rotative movement to the rock shafts 18 and 19 for a purpose to be hereinafter explained.

26 is a transverse rock shaft journaled to the tractor frame and located intermediate of the rock shafts 18 and 19. This rock shaft is provided with a crank arm 27 joined by a link 28 to a pivotally supported manually operable lever 29 located adjacent to the lever 23 and provided with a latch bolt 30 that engages a toothed quadrant 31 alongside the toothed quadrant 24.

32 is a clutch operating rock shaft extending transversely of the tractor frame to which it is journaled. For convenience of description, the function of this shaft, which is located in front of the driver's seat, may be at this time set forth only in as far as it is used to throw the clutch of the transmission gear of the tractor in discontinuing travel of such tractor under normal conditions. In this connection the rock shaft 32 is provided with a pedal 33 that may be operated by foot pressure and with a crank arm 34 (Fig. I), having fitted to it a connecting rod 35 that leads to a clutch throwing device of any suitable and ordinary construction.

In Fig. I I have shown the connecting rod 35 pivoted to a bell crank lever on the clutch housing, and since these elements are not herein claimed, a further description thereof is deemed unnecessary.

36 is a transverse rock shaft journaled to the tractor frame and provided with a pedal 37. The utility of this rock shaft will be hereinafter set forth.

38 are hangers depending from the longitudinal side beams 4 of the tractor frame and by which the plow frame about to be described is supported at one of its sides.

The plow frame, designated A in the drawings, is a rectangular structure comprising side bars 39 and 40, a front end bar 41, and a rear end bar 42. This frame is suspended beneath the tractor frame and its side bar 39 is hinged to the hangers 38 by shackles, each comprising a pair of arms 43 spaced from each other, and horizontal pivot rods 44 mounted in said arms which extend loosely through the lower ends of the hangers 38. It may be here mentioned that, with a particular object in view to be hereinafter specified, the width of the hangers 38 is less than the spaces between the shackle arms 43, a construction that permits longitudinal movement of the plow frame relative to the tractor frame. The opposite side of the plow frame A is supported for vertical adjustment by lever arms 45 and 46 fixed, respectively, to the transverse rock shafts 18 and 19 and hanger links 47 and 48 having pivotal connection at their ends with said lever arms and with the side bar 40 of the plow frame A. This construction permits of the plow frame A being raised or lowered at the side at which the frame side bar 40 is located, the hangers 38 serving as supporting members for the frame during the raising and lowering movements, accomplished through the medium of the rock shafts 18 and 19 and parts coöperable therewith. It will be apparent that when the connecting rod 20 uniting the crank arms 18' and 19' is shifted in one direction, the rock shafts will be so rotated as to cause them to elevate the lever arms 45 and 46 to lift the plow frame, whereas when the rod 20 is moved in the opposite direction the parts will be so actuated as to lower said frame.

I have herein shown my plow as including a plurality of plows proper arranged in gang and will in the description hereinafter given describe a gang plow structure with the understanding that I do not limit myself to the use of any particular plows proper. The plows proper herein shown are arranged in a parallel series, and comprise the usual mold boards 49, shares 50, and beams 51 the latter being united at their forward ends by a cross connection 52 (see Fig. II). The plow beams 51 are pivotally connected at their forward ends to the side bars 39 and 40 of the plow frame A by a U-shaped stirrup 53 the arms of which are journaled to the side bars of the plow frame at 54. The plow beams are also pivotally connected to the side bars of the plow frame by a rear stirrup 55 of U-shape the arms 56 of which are provided with screw threaded ends 57 extending through pivot blocks 58 pivoted to the side bars of the plow frame and bearing front and rear adjusting nuts 59. By making the rear stirrup as described, and providing the adjustable connection between the arms of the stirrup and the pivot blocks fitted to the side bars of the plow frame, I am enabled to lengthen or shorten the stirrup arms, between the pivot blocks 58 and the points of connection of the stirrup to the plow beams, so that the rear portions of said beams may, if desired, be caused to swing in a less or greater arc than the front ends of the beams, thereby raising or lowering the heels of the plow, permitting more or less penetration as conditions of the soil may require.

The plows proper and the plow frame of my traction plow are adapted to be elevated and lowered by manual operation of the lever 29 hereinbefore mentioned, and they are also adapted to be elevated by power derived from the engine of the tractor, but I will at present describe only the mechanism for the manual operation. This mechanism includes, aside from the rock shaft 26 and the lever 29, a link 28 connected to said rock shaft, a lever arm 60 fixed to said rock shaft, and a lift rod 61 pivoted to said lever arm at its upper end and loosely fitted at its lower end to the rear stirrup 55 (see Figs. I, II and III). It will be appreciated that, when the upper end of the lever 29 is thrown rearwardly, the lower end is thrown forwardly, and the plows proper will be elevated. To lower the plows proper it is only necessary to move the lever 29 to the desired degree in the opposite direction and the parts will move downwardly.

The draft connection between the plow frame and the draft member of the tractor, the latter being in the accompanying drawings the forward axle 2, comprises a draft rod 62 attached to the plow frame A and provided at its forward end with a head 63. The draft rod is operable in one of a pair of spring incasing members 64 and 65 which are of cup shape and have their open ends presented in opposite directions. As illustrated in the drawings the coupling member 65 extends into the coupling member 64 and said members are adjustably connected to each other in order that their combined length may be increased or diminished. The coupling member 65 is attached to the axle 2 by a suitable clip 66. Within the coupling members is a cushion draft spring 67 which surrounds the draft rod 62 and is interposed between the head 63 of said rod and the rear end wall of the coupling member 64. It will be obvious that I thus provide a construction which will permit of the plow frame A, and the plows proper carried thereby, being stopped by an obstruction while the tractor continues its forward travel to a limited degree. By making such provision, in combination with means for automatically throwing the motor of my traction plow out of action, as will be hereinafter explained, the shock caused by the striking of an obstruction is cushioned and the tractor is automatically stopped to prevent injury to the plows proper and the members associated therewith.

The means for automatically stopping the tractor when the plows proper strike an obstruction comprises, an arm 70 (Fig. III) depending from the clutch throwing shaft 32 and a cable 71 connecting said arm 70 to an arm 72 on one of the plow beams. It will be understood that the clutch throwing shaft 32 may be rocked through the medium of a pedal 33 to stop the tractor. When one of the plows strikes an obstruction the clutch throwing shaft 32 is automatically rocked to stop the tractor, the movement being accomplished in the following manner: The plows, plow beams 51, and plow frame A are prevented from advancing while the tractor frame including the side beams 4 and 4' and the front axle 2 moves forwardly a slight distance. The spring 67 (Fig. III) is thereby compressed, and the hangers 38, to which the plow frame is pivoted, move forwardly on the pivot pins 44. The clutch throwing shaft 32, carried by the tractor frame, also moves forwardly while the post 72 (Fig. III) remains stationary. This action tightens the cable 71 and causes the clutch throwing shaft 32 to be rotated, with the result of stopping the tractor. The tractor can then be backed a sufficient distance to free the plows from the obstruction. The plows may then be lifted to a point above the obstruction in the ground by operating the lifting lever 29 (Fig. III), said lever being connected to the plow beams 51 through the medium of the members 28, 27, 26, 60, 61 and 55. If necessary, or desirable, the power for lifting the plows from the ground may be derived from the jack shaft 15 as will be presently described.

The latch bolt 30 carried by the lifting lever 29 is normally interlocked with the quadrant 31 so as to hold the plows at the desired elevation, and when the lifting power is derived from the jack shaft 15 it is necessary to disengage the latch bolt from the quadrant, thereby unlocking the plow holding means and permitting the plows to be lifted through the medium of a lifting cable 74 attached to a plow beam 51.

I will now describe the means for unlocking the lifting lever 29 from the quadrant 31 and thereafter lifting the plows by power from the jack shaft. This mechanism is shown most clearly in Fig. I and Fig. III. The lifting cable 74 leads from a plow beam 51 upwardly over a pulley 75, horizontally around a pulley 76 on the tractor beam 4' and from thence to a winding drum 77, the end of the cable being secured to the winding drum. The winding drum is slidably fitted to a bearing sleeve 78 through which the jack shaft 15 passes. 79 designates a clutch device at one end of the jack shaft. 82 designates a clutch throwing lever, pivoted at 83 to the tractor beam 4', and fitted to an annular groove 84 in the winding drum 77. The clutch throwing lever 82 may be operated to slide the winding drum along the bearing sleeve 78, thereby engaging the clutch elements with each other. This operation will cause the winding drum 77 to rotate with the jack shaft 15 with the result of winding the cable 74 onto the drum 77 to lift the plows from the ground.

The means for operating the clutch throwing lever 82 comprises the rock shaft 36 extending across the tractor and provided with a foot pedal 37. An arm 87 secured to the rock shaft 36 is connected to the clutch throwing lever 82 by a cable 88. When the pedal 37 is depressed the shaft 36, arm 87, cable 88 and clutch throwing lever 82 are operated to shift the winding drum 77 toward the drive clutch member 79. Before the winding drum is coupled to the drive clutch member, the lifting lever 29 is released from the quadrant 31 to permit the plows to be elevated by the lifting cable 74.

The means for automatically releasing the lifting lever 29 comprises an arm 89 secured to the pedal shaft 36, a bell crank lever 90 and a throw bar 91 connecting the arm 89 to the bell crank lever 90. The latch bolt 30 carried by the lifting lever 29 is provided with an extension 30′ which lies directly above the long arm of the bell crank lever 90. When the pedal 37 is depressed, and before the winding drum 77 starts to rotate, the bell crank lever 90 moves to disengage the latch bolt 30 from the quadrant 31, thereby releasing the plows and permitting them to be lifted by the cable 74.

The clutch throwing lever 82 is formed with an arm 93 through which the cable 74 passes, and said cable is provided with a yieldable abutment 94 adapted to engage the arm 93 with the result of rocking the clutch throwing lever 82 so as to disengage the clutch elements.

Referring now to Fig. III, it will be noted that the plows proper and plow beams 51 are supported by the U-shaped stirrups 53 and 55 and that the rear stirrup 55 is adjustably supported by the hanger link 61. The combined weight of the plows and plow beams tends to rock the stirrup 53 downwardly. However, this weight is counterbalanced by a spring 95 connecting an arm 96 on the stirrup 53 to an arm 97 on the plow frame A.

The plow beams may be adjusted to set the plows proper at various angles by adjusting the nuts 59 on the threaded ends of the stirrup 55. Adjusting these nuts will raise or lower the rear ends of the plow beams so as to tilt the plows proper to the angle desired for the plowing operation.

When my traction plow is in service one of the front wheels 1 and the rear wheel 5 run in furrows while the other ground wheel 1 rides over unplowed ground. This causes the main tractor frame to assume an inclined position, but the plow frame A being hinged at one side to the tractor frame, may be adjusted to the desired position by adjusting the hanger links 48 at the opposite side of the plow frame (Fig. III).

These hanger links support one side of the plow frame and said links are movable by the hand lever 23 as hereinbefore described.

I claim:—

1. In a plow, a main frame, a plow frame carried by said main frame, a plow beam pivotally connected to said plow frame, a plow secured to said plow beam, a support securing one end portion of said plow beam to said main frame, and a counterbalance spring connecting the other end portion of said plow beam to said plow frame.

2. In a plow, a main frame, a plow frame, a hinge connecting one side of said plow frame to said main frame, the axis of said hinge being approximately horizontal, a lifting device secured to the opposite side of said plow frame, said lifting device being operable to rock the plow frame about the horizontal axis of said hinge, a plow, pivot members connecting said plow to said plow frame, the axes of said pivot members being approximately horizontal and approximately at right angles to the axis of said hinge, and a manually operable plow lifter associated with said plow and adapted to actuate said pivot members to adjust the plow independently of said plow frame.

3. In a plow, a plow frame, a plow beam, a plow secured to said plow beam, and connecting devices including a stirrup having a pair of arms each of which is pivotally connected to said plow beam, each of said arms having a screw threaded end, a pair of pivot members pivotally connected to said plow frame and adapted to receive the screw threaded ends of said pair of arms, and nuts screwed onto said screw threaded ends and adapted to engage said pivot members, said nuts being adjustable to vary the distance between the pivots at the ends of each of the arms of the stirrup.

H. W. KARDELL.

In the presence of—
E. Linn,
E. Clark.

Copies of this patent may be obtained for five cents each, by addressing the "Commissioner of Patents, Washington, D. C."